US010949090B2

(12) United States Patent
Yonezawa

(10) Patent No.: US 10,949,090 B2
(45) Date of Patent: Mar. 16, 2021

(54) MEMORY SYSTEM THAT STORES DATA DESIGNATED BY A DELETION REQUEST IN NONVOLATILE MEMORY

(71) Applicant: Toshiba Memory Corporation, Tokyo (JP)

(72) Inventor: Shinji Yonezawa, Machida Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 19 days.

(21) Appl. No.: 15/693,411

(22) Filed: Aug. 31, 2017

(65) Prior Publication Data

US 2018/0275875 A1 Sep. 27, 2018

(30) Foreign Application Priority Data

Mar. 23, 2017 (JP) .............................. JP2017-057713

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0626* (2013.01); *G06F 3/0652* (2013.01); *G06F 3/0655* (2013.01); *G06F 3/0658* (2013.01); *G06F 3/0659* (2013.01); *G06F 3/0679* (2013.01); *G06F 3/0688* (2013.01); *G06F 12/0246* (2013.01); *G06F 2212/1016* (2013.01); *G06F 2212/7201* (2013.01); *G06F 2212/7205* (2013.01); *G06F 2212/7208* (2013.01)

(58) Field of Classification Search
CPC ...... G06F 3/061; G06F 3/0655; G06F 3/0679; G06F 12/0246; G06F 2212/7201; G06F 3/0626; G06F 3/0652; G06F 3/0658; G06F 3/0659; G06F 3/0688; G06F 2212/7208; G06F 2212/1016; G06F 2212/7205
See application file for complete search history.

(56) References Cited

U.S. PATENT DOCUMENTS 6,052,695 A * 4/2000 Abe ..................... G06F 11/1471
7,334,098 B1 * 2/2008 Poston ................ G06F 11/1471
711/154

(Continued)

FOREIGN PATENT DOCUMENTS

JP 2010-152514 7/2010
JP 2011-128998 6/2011
(Continued)

*Primary Examiner* — Charles Rones
*Assistant Examiner* — Tong B. Vo
(74) *Attorney, Agent, or Firm* — Kim & Stewart LLP

(57) ABSTRACT

A memory system which is accessible to a host device includes a volatile memory, a nonvolatile memory, and a memory controller that controls the volatile memory and the nonvolatile memory. The memory controller stores first data, which is stored in the volatile memory, in the nonvolatile memory, each time the memory controller stores second data, which is stored in the volatile memory, in the nonvolatile memory. The first data indicates a logical address and a deletion range designated by a deletion request received from the host device, and the second data is designated by a write request received from the host device.

15 Claims, 8 Drawing Sheets

(51) Int. Cl.
  *G06F 12/0831* (2016.01)
  *G06F 12/128* (2016.01)
  *G06F 12/0808* (2016.01)
  *G06F 12/0895* (2016.01)
  *G06F 12/0897* (2016.01)
  *G06F 12/0891* (2016.01)
  *G06F 12/0864* (2016.01)
  *G11C 7/10* (2006.01)
  *G11C 8/06* (2006.01)
  *G11C 8/18* (2006.01)
  *G11C 8/08* (2006.01)

(56) References Cited

U.S. PATENT DOCUMENTS

| | | | | |
|---|---|---|---|---|
| 7,571,348 | B2* | 8/2009 | Deguchi | G06F 11/1471 714/15 |
| 8,004,884 | B2* | 8/2011 | Franceschini | G06F 13/161 365/163 |
| 8,706,988 | B2 | 4/2014 | Yonezawa et al. | |
| 8,949,512 | B2 | 2/2015 | Vogan et al. | |
| 9,026,734 | B2 | 5/2015 | Hashimoto | |
| 9,229,863 | B2 | 1/2016 | Yoshihashi et al. | |
| 9,323,661 | B2* | 4/2016 | Harasawa | G06F 12/0246 |
| 2005/0141312 | A1* | 6/2005 | Sinclair | G06F 11/1072 365/222 |
| 2006/0253645 | A1* | 11/2006 | Lasser | G06F 11/1441 711/103 |
| 2008/0126712 | A1* | 5/2008 | Mizushima | G06F 12/0246 711/141 |
| 2008/0228827 | A1* | 9/2008 | Perlman | G06F 21/6209 |
| 2009/0077312 | A1* | 3/2009 | Miura | G06F 12/0804 711/113 |
| 2010/0169597 | A1* | 7/2010 | Yonezawa | G06F 12/0246 711/162 |
| 2012/0144097 | A1* | 6/2012 | Hashimoto | G06F 3/061 711/103 |
| 2012/0221776 | A1* | 8/2012 | Yoshihashi | G06F 12/0246 711/103 |
| 2012/0265925 | A1* | 10/2012 | Miura | G06F 12/0246 711/103 |
| 2013/0339587 | A1* | 12/2013 | Asnaashari | G06F 12/06 711/103 |
| 2014/0122821 | A1* | 5/2014 | Park | G06F 3/0671 711/166 |

FOREIGN PATENT DOCUMENTS

JP 2012-123499 6/2012
JP 2013-200688 10/2013

* cited by examiner

MEMORY SYSTEM THAT STORES DATA DESIGNATED BY A DELETION REQUEST IN NONVOLATILE MEMORY

CROSS-REFERENCE TO RELATED APPLICATION

This application is based upon and claims the benefit of priority from Japanese Patent Application No. 2017-057713, filed Mar. 23, 2017, the entire contents of which are incorporated herein by reference.

FIELD

Embodiments described herein relate generally to a memory system.

BACKGROUND

A memory system including a nonvolatile memory such as NAND type flash memory and a memory controller is known.

DETAILED DESCRIPTION

Embodiments provide a memory system with improved performance.

In general, according to one embodiment, a memory system which is accessible to a host device includes a volatile memory, a nonvolatile memory, and a memory controller that controls the volatile memory and the nonvolatile memory. The memory controller stores first data, which is stored in the volatile memory, in the nonvolatile memory, each time the memory controller stores second data, which is stored in the volatile memory, in the nonvolatile memory. The first data indicates a logical address and a deletion range designated by a deletion request received from the host device, and the second data is designated by a write request received from the host device.

Hereinafter, exemplary embodiments will be described with reference to the drawings.

Embodiments

Figure 1:
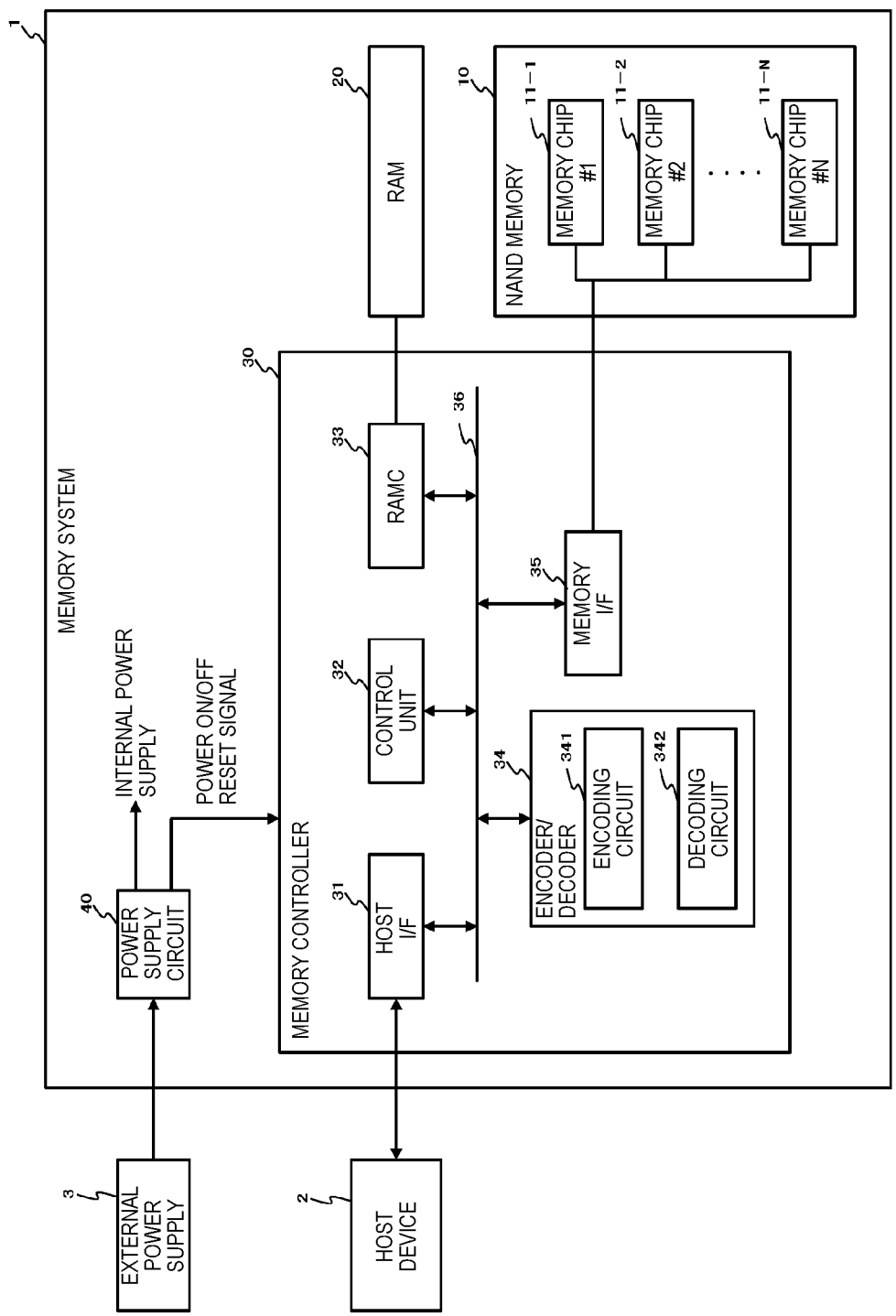
FIG. 1 is a block diagram of a memory system according to an embodiment.

FIG. 1 is a block diagram of a memory system according to an embodiment. The memory system 1 is connected to a host device 2 via a communication line and functions as an external storage device of the host device. The host device 2 may be, for example, an information processing device such as a personal computer, a mobile phone, an imaging device, a portable terminal such as a tablet computer or a smartphone, a game device, or an onboard terminal such as a car navigation system.

As illustrated in FIG. 1, the memory system 1 includes a NAND memory 10, a random access memory (RAM) 20, a memory controller 30 that controls the NAND memory 10 and the RAM 20, and a power supply circuit 40 to which power is supplied from an external power supply 3.

The NAND memory 10 is connected to the memory controller 30 via a bus. Further, the NAND memory 10 includes a plurality of memory chips #1 11-1, . . . , and memory chips #N 11-N which are flash memories, each of which has the same circuit configuration, where N may be any natural number.

In the following description, each of the reference numerals 11-1, . . . , and 11-N will be used when one of the plurality of memory chips 11-1 needs to be specified, . . . , 11-N, and the reference numeral 11 will be used when any of the memory chips is referred to or when one memory chip does not need to be distinguished from another memory chip.

The respective memory chips 11 may operate, for example, cooperatively and independently, and are each, for example, a NAND type flash memory chip. In the NAND flash memory chip, in general, writing and reading are performed in a data unit which is called a page, and erasing is performed in a data unit which is called a block.

In the present embodiment, the NAND memory 10 is used as a nonvolatile memory, that is, a nonvolatile storage unit. However, as the nonvolatile storage, a nonvolatile semiconductor memory, such as a three-dimensional structure flash memory, a resistance random access memory (ReRAM) or a ferroelectric random access memory (FeRAM), other than the NAND type flash memory may be used. Further, a storage unit, such as a magnetic disk, other than the semiconductor memory may be used.

The RAM 20 is a volatile memory such as a dynamic random access memory (DRAM). However, without being limited to the DRAM, the RAM 20 may be a static random access memory (SRAM) or may be configured as a general-purpose memory other than the DRAM and the SRAM. Further, the RAM 20 may be mounted outside the memory controller 30 independently from the memory controller 30, or may be mounted inside the memory controller 30.

The memory system 1 may be a memory card in which the NAND memory 10, the RAM 20, and the memory controller 30 are configured as one package, or a solid state drive (SSD).

The memory controller 30 controls writing into the NAND memory 10 according to a write request from the host device 2. In the present embodiment, a request is, for example, an instruction or a command. Further, the memory controller 30 controls reading from the NAND memory 10 according to a read request from the host device 2. The memory controller is also referred to as a memory control circuit, a controller, or a control circuit.

The memory controller 30 stores management information, which is used for the memory controller 30 to access the NAND memory 10, in the RAM 20. Details of the management information will be described later. In addition, the memory controller 30 uses the RAM 20 as a buffer for data transfer between the host device 2 and the NAND memory 10. Further, the RAM 20 may be used as a buffer into which a firmware program to be described later is loaded.

The power supply circuit 40 generates power for use by the memory system 1 from power supplied by the external power supply 3. The generated power is supplied to the respective units in the memory system 1, such as the NAND memory 10. The external power supply 3 may be mounted inside the host device 2 or provided independently from the host device 2.

Further, the power supply circuit 40 detects the voltage of the external power supply 3 rising or falling and generates a power-on reset signal or a power-off reset signal. The power-on reset signal and the power-off reset signal are sent to the memory controller 30.

The memory controller 30 includes a host interface (host I/F) 31, a control unit 32, a RAM controller (RAMC) 33, an encoder/decoder 34, and a memory interface (memory I/F) 35.

The host I/F 31, the control unit 32, the RAM 23, the encoder/decoder 34, and the memory I/F 35 are connected by an internal bus 36.

The host I/F 31 performs a process according to an interface standard to output a request, user data and the like received from the host device 2, to the internal bus 36, and to transmit user data read from the NAND memory 10, a response from the control unit 32, and the like, to the host device 2. In the present embodiment, data written into the NAND memory 10 in response to a write request from the host device 2 is referred to as user data.

The interface standard with which the host I/F 31 complies may be any interface standard such as a serial advanced technology attachment (SATA) interface, a peripheral component interconnect express (PCIe), a universal serial bus (USB), a serial attached SCSI (SAS), Thunderbolt®, Ethernet®, or fibre channel.

The control unit 32 controls the respective components of the memory system 1. The control unit 32 may be implemented by hardware or may be implemented when a processor such as a central processing unit (CPU) executing a firmware program.

In the case where the processing of the control unit 32 is implemented by a processor executing a firmware program, the process of the control unit 32 is implemented, for example, in the manner that, upon receiving the power from the external power supply 3, the memory system 1 reads a firmware program stored in a ROM (not shown) into the RAM 20 or some other memory (not shown) in the control unit 32 and executes a predetermined process according to the firmware program. Herein, the processor is also referred to as a core or a processor core.

Upon receiving a request from the host device 2 via the host I/F 31, the control unit 32 instructs the memory I/F 35 of a command to the NAND memory 10 according to the request.

The request transmitted from the host device 2 includes a data read request, a data write request, a data deletion request and the like.

The control unit 32 also determines the correspondence between a logical address (e.g., logical block address (LBA)) designated by a write request received from the host device 2, and a physical address indicating a storage area on the NAND memory 10 in which user data designated by the write request is stored. Then, the control unit 32 instructs the memory I/F 35 to write the user data into the physical address.

The LBA is an address managed by an address management method of the host device. The host device 2 accesses the memory system 1 in units of a sector which is the minimum unit of the LBA.

Upon receiving a read request from the host device 2, the control unit 32 converts a logical address designated by the read request into a physical address and instructs the memory I/F 35 to read from the physical address.

The deletion request is a command from the host device 2 to request the memory system 1 to delete data and is transmitted to the memory system 1, for example, when data deletion is performed by an OS on the host device 2. One example of a deletion request is a trim command.

An example of the trim command may be Deallocate of a 06h DataSet Management command described in Information technology ATA/ATAPI Command Set-3 (ACS3) or a 09h Dataset Management command described in NVM Express Revision 1.1. This is the method where, when data is deleted on the OS of the host device 2, the host device 2 provides a notification of a logical address space where the deleted data existed, as an LBA Range Entry consisting of a set including an LBA and a sector number, to an external storage device such as the memory system 1, so that the external storage device may also treat the logical address space as an empty area.

Upon receiving the deletion request from the host device 2, the control unit 32 performs a process such as deleting or invalidating the correspondence between an LBA designated by the deletion request and a physical address corresponding to the LBA.

Further, in addition to the above-mentioned command, other commands such as SCT Command Transport described in Information technology ATA/ATAPI Command Set-3 (ACS-3), a 08h Write Zeroes command described in NVM Express Revision 1.1, or other vendor unique commands, may be used to cause the memory system 1 to execute the same processing as that performed when receiving the trim command.

The RAMC 33 controls the RAM 20, has a function of a communication interface between the memory controller 30 and the RAM 20, and executes data transfer between the RAM 20 and the memory controller 30.

The control unit 32 temporarily stores the user data received by the memory controller 30 from the host device 2, in the RAM 20 via the RAMC 33 until the user data is stored in the NAND memory 10. In addition, the control unit 32 temporarily saves the user data read from the NAND memory 10 in the RAM 20 via the RAMC 33 until the user data is transmitted to the host device 2.

The encoder/decoder 34 includes an encoding circuit 341 and a decoding circuit 342. The encoder/decoder is also called an error correcting code (ECC) circuit.

The encoding circuit 341 encodes the data held in the RAM 20 and generates a code word having data and a redundant portion (e.g., parity). The encoding circuit 341 encodes user data of a first data length to generate a code word of a second data length. For example, a Bose-Chaudhuri-Hocquenghem (BCH) code, a Reed-Solomon (RS) code, a low density parity check (LDPC) code or the like may be used in the encoding performed by the encoding circuit 341. Meanwhile, the error correction code used by the encoding circuit 341 is not limited to these codes.

The decoding circuit 342 acquires the code word that is data read from the NAND memory 10, via the memory I/F 35, and decodes the acquired code word. When the decoding circuit 342 fails in an error correction at the time of the decoding, the decoding circuit 342 notifies the control unit 32 of the error correction failure.

The memory I/F 35 controls the NAND memory 10. The memory I/F 35 writes the code word output from the encoding circuit 341 into the NAND memory 10 under a control of, for example, the control unit 32. Further, the memory I/F 35 reads data from the NAND memory 10 under a control of, for example, the control unit 32 and transfers the data to the decoding circuit 342 via the RAM 20. Further, the memory I/F 35 erases the data stored in the NAND memory 10 under a control of, for example, the control unit 32.

Figure 2:
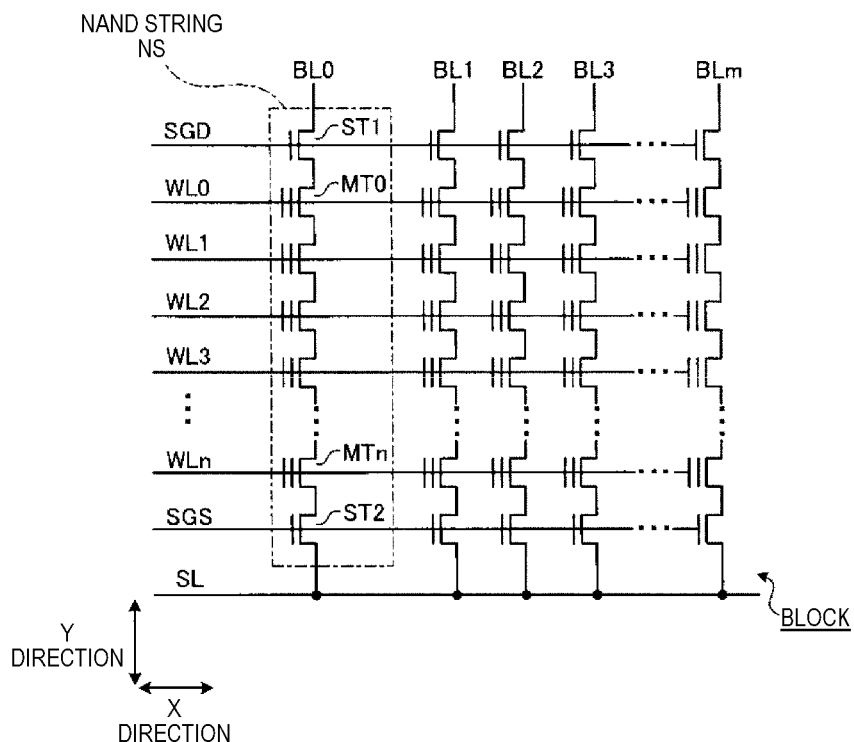
FIG. 2 is a circuit diagram of one block included in a NAND memory of the memory system according to the embodiment.

Next, the configuration of the NAND memory 10 will be described. The NAND memory 10 is arranged into a plurality of blocks which are units of data erasure. FIG. 2 is a circuit diagram of one block included in the NAND memory. In FIG. 2, it is assumed that the lateral direction on the plane of the sheet is an X direction, and the direction perpendicular to the X direction on the plane of the sheet is a Y direction.

Each block of the NAND memory 10 has (m+1) NAND strings NS (m is an integer of 0 or more) arranged sequentially along the X direction. Each of the NAND strings NS has (n+1) memory cell transistors MT0 to MTn (n is an integer of 0 or more) sharing a diffusion region (source region or drain region) between memory cell transistors MT adjacent to each other in the Y direction and connected to each other in series in the Y direction, and select transistors ST1 and ST2 disposed at both ends of the string of the (n+1) memory cell transistors MT0 to MTn.

Each of the memory cell transistors MT0 to MTn is configured with a metal oxide semiconductor field effect transistor (MOSFET) having a stacked gate structure formed on a semiconductor substrate. Here, the stacked gate structure includes a charge storage layer (e.g., floating gate electrode) formed on the semiconductor substrate with a gate insulating film interposed therebetween, and a control gate electrode formed on the charge storage layer with an inter-gate insulating film interposed therebetween.

The NAND memory 10 of the memory system according to the present embodiment may be a multi-level memory in which threshold voltages of the memory cell transistors MT0 to MTn are changed according to the number of electrons stored in the floating gate electrode and each of the memory cell transistors MT0 to MTn may store data of 2 bits or more according to a difference in the threshold voltages, or may be a binary type memory in which each of the memory cell transistors MT0 to MTn may store data of one bit.

Word lines WL0 to WLn are respectively connected to the control gate electrodes of the memory cell transistors MT0 to MTn constituting the NAND strings NS, and memory cell transistors MTi (i=0 to n) in the respective NAND strings NS are commonly connected by the same word line WLi (i=0 to n). That is, the control gate electrodes of the memory cell transistors MTi in the same row within the block are connected to the same word line WLi. The (m+1) memory cell transistors MTi connected to the same word line WLi are treated as one page. In the NAND memory 10, data is written and read in the unit of the page. The group of the (m+1) memory cell transistors MTi connected to the same word line WLi is the unit forming one page. In a case of a multi-level memory capable of storing four values, the group of the memory cell transistors MTi connected to the same word line WLi forms two pages. Assuming that a page to be written first is a lower page and a page to be written second is an upper page, data is written and read in the unit of two pages in the NAND memory 10.

Bit lines BL0 to BLm are respectively connected to the drains of the (m+1) select transistors ST1 in one block, and a select gate line SGD is commonly connected to the gates of the (m+1) select transistors ST1. The sources of the select transistors ST1 are respectively connected to the drains of the memory cell transistors MT0. Similarly, a source line SL is commonly connected to the sources of the (m+1) select transistors ST2 in one block, and a select gate line SGS is commonly connected to the gates of the (m+1) select transistors ST2. Further, the drains of the select transistors ST2 are respectively connected to the sources of the memory cell transistors MTn.

Although not shown, a bit line BLj (j=0 to m) in one block and a bit line BLj in another block are commonly connected to the drains of their respective select transistors ST1. That is, the NAND strings NS in the same column in the plurality of blocks are connected by the same bit line BLj.

The memory I/F 35 and each memory chip 11 are connected to each other by a bus according to a NAND interface. Signals transmitted and received on the bus are, for example, a chip enable signal /CE, an address latch enable signal ALE, a command latch enable signal CLE, a write enable signal /WE, a read enable signal /RE, an input/output signal I/O, etc. The signal /CE is a signal for making the memory chip 11 go into an enable state. The signal ALE is a signal for notifying, to the memory chip 11, that an input signal is an address. The signal CLE is a signal for notifying, to the memory chip 11, that an input signal is a command. The signal /WE is a signal for enabling an input signal to be written into the memory chip 11. The signal /RE is a signal for enabling an output signal to be read into the memory I/F 35. The input/output signal I/O is a signal such as a command, address, or data.

Figure 3:
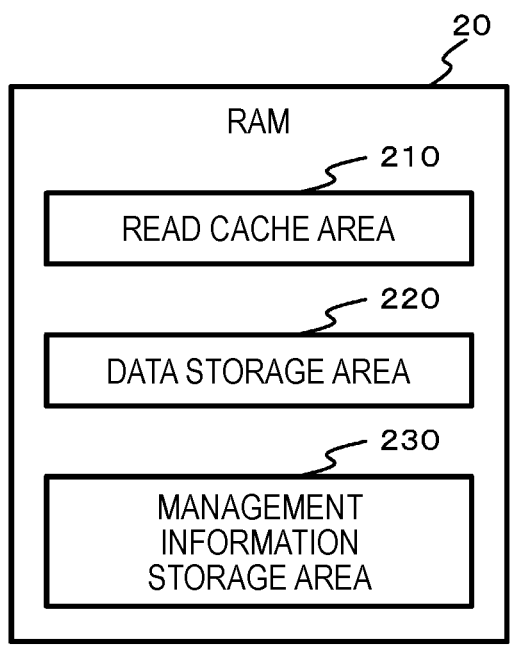
FIG. 3 is a view schematically illustrating storage areas of a RAM of the memory system according to the embodiment.

Next, data stored in the RAM 20 and the NAND memory 10 will be described. FIG. 3 is a view schematically illustrating storage areas of the RAM 20, and FIG. 4 is a view schematically illustrating storage areas of the NAND memory 10.

As illustrated in FIG. 3, the RAM 20 includes a read cache area 210 in which data requested to be read by the host device 2 is temporarily stored, a data storage area 220 in which user data designated by a write request from the host device 2 and an address designated by a deletion request from the host device are temporarily stored, and a management information storage area 230 in which management information for managing storage locations of data stored in the RAM 20 and the NAND memory 10 is stored.

The management information storage area 230 may additionally have a work area which is used when the control unit 32 restores the management information. The management information stored in the management information storage area 230 may include master information for managing the storage locations of data stored in the RAM 20 and the NAND memory 10 and update information indicating an updated portion for the master information when the master information has been updated.

Figure 4:
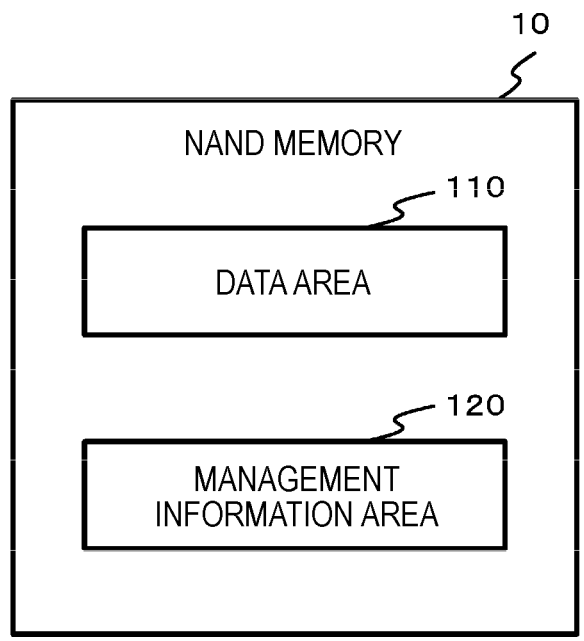
FIG. 4 is a view schematically illustrating storage areas of the NAND memory of the memory system according to the embodiment.

As illustrated in FIG. 4, the NAND memory 10 includes a data area 110 in which user data designated by a write request from the host device 2 and an address designated by a deletion request from the host device 2 are stored, and a management information area 120 in which information including at least a portion of the management information stored in the management information storage area 230 of the RAM 20 is stored.

The control unit 32 may store, in the management information area 120, information including a snapshot which is used to manage the storage location of data stored in the NAND memory 10 and is a copy of the master information at a certain time point, a log which is difference information from the snapshot, and a pointer indicating a storage location of the snapshot.

Further, when managing the data area 110 and the management information area 120, the control unit 32 may divide an area of each block of the NAND memory 10 into areas according to the page size unit, which is the unit of data writing or reading.

As described above, the RAM 20 includes the read cache area 210, the data storage area 220, and the management information storage area 230.

The read cache area 210 is an area used by the memory controller 30 to temporarily store data read from the NAND memory 10 and output the data to the host device 2.

The data storage area 220 is an area used by the memory controller 30 to temporarily store data designated by a write request or data of a deletion request from the host device 2 and output the data to the NAND memory 10.

The deletion request data may be data or information that may specify a starting LBA and the size of the deletion range to specify a deletion target range designated by the deletion request received from the host device 2. For example, the data itself included in the deletion request received from the host device 2 may be used. The form of the data may be arbitrary and may be changed.

Data stored in the read cache area 210 and the data storage area 220 is managed in units of a sector.

When resources of the data storage area 220 are insufficient, the control unit 32 stores, in the data area 110 of the NAND memory 10, at least a portion of user data or deletion request data stored in the data storage area 220.

In addition, when the user data or deletion request data stored in the data storage area 220 is accumulated and reaches a certain size, or at a regular or arbitrary timing, the control unit 32 stores at least a portion of the user data or deletion request data stored in the data storage area 220, in the data area 110 of the NAND memory 12.

When storing the user data or the deletion request data in the data area 110 of the NAND memory 10, the control unit 32 stores each user data or each deletion request data to be stored in the data area 110 of the NAND memory 12 in association with log information.

When the data to be stored in the NAND memory 10 is user data, the log information includes, for example, identification information, a logical address log which is information indicating the LBA of the user data, and time-series information.

When the data to be stored in the NAND memory 10 is deletion request data, the log information includes, for example, identification information and time-series information.

The identification information is information capable of identifying whether the data to be stored in the NAND memory 10 is user data or deletion request data.

In addition, the time-series information may be any information that may specify a reception procedure or a reception time of a request corresponding to the data to be stored in the NAND memory 10 from the host device. The time-series information may be, for example, information indicating a time at which a write request or a deletion request is received from the host device 2, or information indicating a numerical value to be counted up each time a write request or a deletion request is received from the host device 2. Here, the information indicating the reception time may be an absolute time such as a year, month, day, hour, minute, and second, or may be a relative time based on a certain time point.

The control unit 32 may store log information for each data to be stored in the NAND memory 10, or collect log information for each of a plurality of data having a predetermined size and store the collected log information at the same time.

The predetermined size is, for example, a page size, a block size, or a cluster size smaller than a page. Each page has a size that is an integer multiple of the cluster size, and thus data of each page includes data of a plurality of clusters.

Further, the control unit 32 may store the log information in a location where the storage location and the address of the storage target data corresponding to the log information are consecutive, or in a location different from the location where the storage location and the address of the storage target data corresponding to the log information are consecutive. Further, the control unit 20 may store the log information in the same page as or a different page from the page in which the storage target data corresponding to the log information is stored. Further, the control unit 20 may store the log information in the same block as or a different block from the block in which the storage target data corresponding to the log information is stored.

Figure 5:
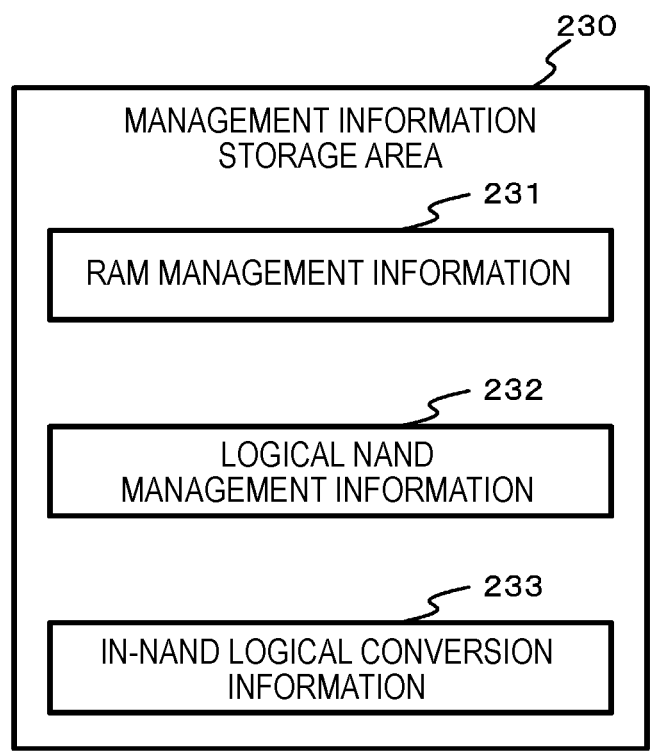
FIG. 5 is a view schematically illustrating management information stored in a management information storage area of the RAM of the memory system according to the embodiment.

FIG. 5 is a view schematically illustrating management information stored in the management information storage area 230 of the RAM 20. The control unit 32 manages the data stored in the RAM 20 or the NAND memory 10 by using the management information stored in the management information storage area 230 of the RAM 20.

The management information stored in the management information storage area 230 may be the following information. For example, the management information may include RAM management information 231 with which the control unit 32 performs data management of the RAM 20 serving as a cache, logical NAND management information 232 with which the control unit 32 performs logical data management in the NAND memory 10, or in-NAND logical address-physical address conversion information (hereinafter, referred to as "in-NAND logical-to-physical conversion information") 233 with which the control unit 32 performs physical data management in the NAND memory 10, a life extension processing of the NAND memory 10, and the like. The RAM management information 231, the logical NAND management information 232, and the in-NAND logical-to-physical conversion information 233 illustrated in FIG. 5 are examples of the management information stored in the management information storage area 230, and the configuration of the management information is not limited thereto.

The control unit 32 stores, in a predetermined physical address in the data storage area 220 of the RAM 20, the user data designated by the write request received from the host device 2. The physical address in the RAM 20 is also called an in-RAM physical address.

In addition, the control unit 32 stores, in a predetermined in-RAM physical address of the data storage area 220 of the RAM 20, the deletion request data received from the host device 2.

In addition, the control unit 32 stores, in a predetermined in-RAM physical address of the read cache area 210, the data read from the NAND memory 10 according to the read request received from the host device 2.

The RAM management information 231 includes, for example, the association between the LBA of the user data and the in-RAM physical address, and a sector flag indicating the presence or absence of data of the sector size unit in a page of the RAM 20. The RAM management information 231 further includes the association between the deletion request data and the in-RAM physical address, and a sector flag indicating the presence or absence of the data of the sector size unit in a page of the RAM 20.

The RAM management information 231 further includes information with which the control unit 32 may specify the identification information and the time-series information with respect to the user data and the deletion request data stored in the data storage area 220.

The logical NAND management information 232 and the in-NAND logical-to-physical conversion information 233 are used by the control unit 32 to manage the data stored in the NAND memory 10. The control unit 32 manages the data in the NAND memory 10 by using the logical NAND management information 232 and the in-NAND logical-to-physical conversion information 233.

In the NAND memory 10, data is stored in a predetermined physical address of the NAND memory 10. The physical address of the NAND memory 10 is also called an in-NAND physical address. In the NAND memory 10, processing units are different between a data write/read processing and a data erase processing. Therefore, when updating data written in a certain NAND physical address in the NAND memory 10, the control unit 32 writes data reflecting a portion that needs to be updated, among the blocks including the written data, in a block different from the original block in which the original data is stored, and furthermore, invalidates data stored in the original block.

In this way, in the NAND memory 10, in the data updating process, the block in which the updated data is stored and the block in which the original data is stored are different from each other. Therefore, the control unit 32 manages the data of the NAND memory 10 by providing a logical NAND block address (hereinafter, referred to as an "in-NAND logical address"), in addition to the in-NAND physical address, in the logical NAND management information 232.

The logical NAND management information 232 includes, for example, relevant information between the LBA of the user data in the page size unit on the RAM 20 and the in-NAND logical address indicating the logical page location of the NAND memory 10 in which the user data on the RAM 20 is stored. Further, the logical NAND management information 232 includes relevant information indicating an address range of a logical block (hereinafter, referred to as a "logical block") having a size equal to the size of a block of the erasure unit in the NAND memory 12. Further, the logical block may be obtained by combining a plurality of physical blocks each having a size equal to the size of a block of the erasure unit in the NAND memory 12.

Further, the in-NAND logical-to-physical conversion information 233 includes the association between the in-NAND logical address and the in-NAND physical address in the NAND memory 10.

Figure 6:
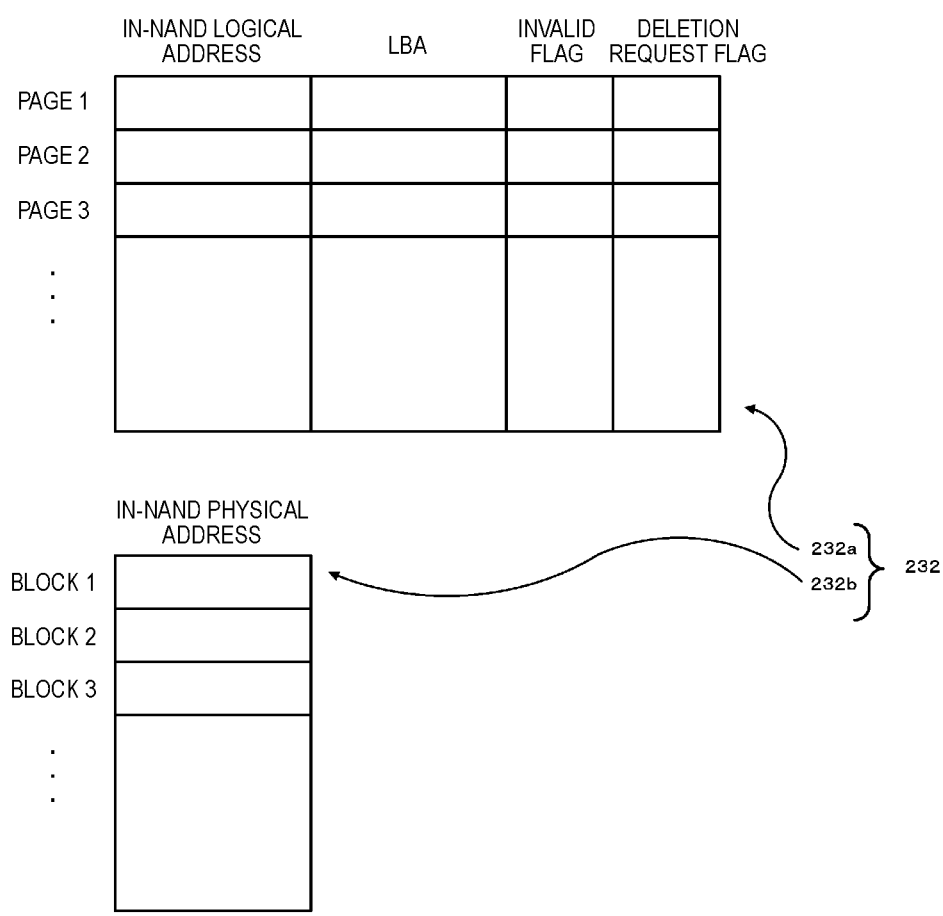
FIG. 6 is a view illustrating an example of logical NAND management information of the memory system according to the embodiment.

FIG. 6 is a view illustrating an example of a logical NAND management information table. As illustrated in FIG. 6, the logical NAND management information 232 includes logical page management information 232a and logical block management information 232b. The logical page management information 232a has one entry for one logical area of one page size, and each entry includes an LBA of data of one page size, an in-NAND logical address (which is the logical NAND block address), an invalid flag indicating whether the page is valid or invalid, a deletion request flag indicating whether the page is designated by a deletion request, and others. A page in which the invalid flag is ON means a page in which the latest data of the same LBA is written in another location and is not referred to. In the logical page management information 232a, the deletion request flag and the invalid flag may be managed by the same flag.

In addition, the logical block management information 232b includes an in-NAND physical address (physical block address) set for a physical area of one block size of the NAND memory 10. Further, the in-NAND physical address and the in-NAND logical address of the NAND memory 10 are associated with each other in the in-NAND logical-to-physical conversion information 233.

By referring to the logical NAND management information 232 and the in-NAND logical-to-physical conversion information 233, the control unit 32 may associate an LBA used in the host device 2, an in-NAND logical address used in the NAND memory 10, and an in-NAND physical address used in the NAND memory 10 with each other. This makes it possible to exchange data between the host device 2 and the memory system 1.

Since the RAM management information 231 disappears by, for example, power-off of the memory system 1, the RAM management information 231 is also called a volatile table.

The logical NAND management information 232 and the in-NAND logical-to-physical conversion information 233 are information for managing data stored in the NAND memory 10. Without this information, data stored in the NAND memory 10 may not be accessed or data stored in the data area 110 of the NAND memory 10 may not be managed. Therefore, in preparation for an unexpected power shutdown of the memory system 1, the control unit 32 stores the logical NAND management information 232 and the in-NAND logical-to-physical conversion information 233 in the NAND memory 10 at a regular or arbitrary timing. Storing in the NAND memory 10 periodically or at arbitrary timing by the control unit 32 is also called non-volatilization or persisting. The tables storing the logical NAND management information 232 and the in-NAND logical-to-physical conversion information 233 in the NAND memory 10 at a regular or arbitrary timing, are also called nonvolatile tables.

The RAM management information 231, the logical NAND management information 232, and the in-NAND logical-to-physical conversion information 233 are also examples of information constituting the management information stored in the management information storage area 230 of the RAM 20. The management information of the memory system according to the present embodiment may be any management information with which the control unit 32 may specify the association between an LBA and a physical address indicating a data storage location in the NAND memory 10, whether each data is valid or invalid, or whether each data is a target of the deletion request, and the configuration of the management information is arbitrary.

Figure 7:
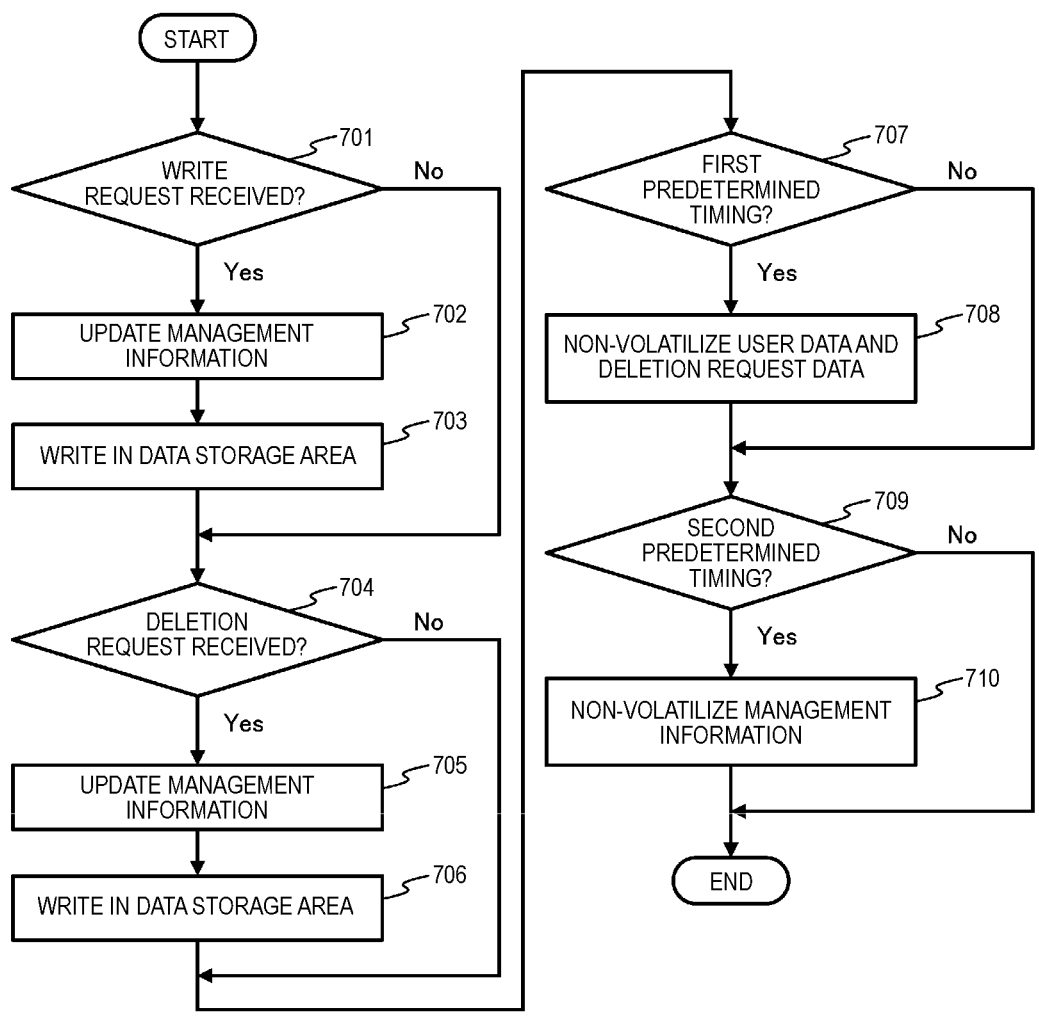
FIG. 7 is a flowchart illustrating an example of non-volatilization processing for a write request and a deletion request in the memory system according to the embodiment.

FIG. 7 is a flowchart illustrating an example of non-volatilization processing for a write request and a deletion request received from the host apparatus 2 of the memory system according to the present embodiment. The flowchart shows a process of receiving a write request or a deletion request from the host device 2 and storing requested data and information corresponding thereto in the NAND memory 100.

In the write request, user data or an LBA of the user data is designated. The memory system 1 may determine whether a write request may be received, and receive the write request from the host device 2 when it is determined that the write request may be received.

In the deletion request, an LBA of data to be deleted or a deletion target LBA range is designated. The memory system 1 may determine whether a deletion request may be received, and receive the deletion request from the host device 2 when it is determined that the deletion request may be received.

In the flowchart of FIG. 7, these processes are omitted, and descriptions will be made on the premise that the memory controller 30 of the memory system 1 may receive a write request and a deletion request from the host system 2 via the host I/F 31.

The control unit 32 of the memory controller 30 determines whether a write request has been received from the host device 2 (step 701).

When it is determined that a write request has been received ("Yes" in step 701), the control unit 32 of the memory controller 30 determines an in-NAND physical address and an in-RAM physical address corresponding to an LBA designated by the write request and reflects information of the designated LBA and the determined physical address in the RAM management information 231, the logical NAND management information 232, and the in-NAND logical-physical conversion information 233 (step 702).

Then, the control unit 32 of the memory controller 30 instructs the encoding circuit 341 to encode user data of a write target designated by the write request, and the encoding circuit 341 encodes the user data of the write target.

The control unit 32 of the memory controller 30 receives the encoded user data from the encoding circuit 341 and writes the encoded data into the data storage area 220 of the RAM 20 (step 703).

Next, the control unit 32 of the memory controller 30 determines whether a deletion request has been received from the host device 2 (step 704). When it is determined that no write request has been received ("No" in step 701), the control section 32 of the memory controller 30 also determines whether a deletion request has been received from the host device 2 (step 704).

When it is determined that a deletion request has been received ("Yes" in step 704), the control unit 32 of the memory controller 30 determines an in-NAND physical address and an in-RAM physical address serving as storage destinations of deletion request data, and reflects the determined physical addresses in the RAM Management information 231, the logical NAND management information 232, and the in-NAND logical-to-physical conversion information 233 (step 705).

The control unit 32 of the memory controller 30 writes the deletion request data into the data storage area 220 of the RAM 20 (step 706).

As shown above, upon receiving the write request or the deletion request from the host device 2, the control unit 32 of the memory controller 30 writes the user data designated by the write request and the deletion request data into the data storage area 220. As described above, when writing data into the data storage area 220, the control unit 32 of the memory controller 30 stores the time-series information corresponding to a time at which the request is received, in at least one of the RAM management information 231 and the data storage area 220, so that the order of receiving the write request or the deletion request may be managed and tracked.

Next, the control unit 32 of the memory controller 30 determines whether a first predetermined timing for non-volatilizing the data stored in the data storage area 220 is reached (step 707). Here, the first predetermined timing may be any arbitrary timing such as a timing when the size of the data stored in the data storage area 220 exceeds a certain size, a timing when the memory system 1 is powered off, or some periodic timing. Here, the certain size may be an arbitrary unit such as a cluster unit or a page unit.

Further, the first predetermined timing may be, for example, a timing when the memory system 1 receives a command designating power-off or a command designating shift to a power saving mode, from the host device 2.

When it is determined that no deletion request has been received ("No" in step 704), the control unit 32 of the memory controller 30 also determines whether the first predetermined timing is reached (step 707).

When it is determined that the first predetermined timing is reached ("Yes" in step 707), the control unit 32 of the memory controller 30 stores the user data and the deletion request data stored in the data storage area 220, in the NAND memory 10 to non-volatilize the user data and the deletion request data (Step 708). This is because it is necessary to reflect and non-volatilize the user data and the deletion request data stored in the data storage area 220 in the data area 110 of the NAND memory 10 in order to prevent the user data and the deletion request data stored in the data storage area 220 of the RAM 20 from being erased due to unexpected power cutoff or the like of the memory system 1.

The storing of the user data stored in the data storage area 220 by the control unit 22 in the data area 110 of the NAND memory 10 includes storing of the log information corresponding to the user data in the data area 110 of the NAND memory 10. In addition, the storing of the deletion request data stored in the data storage area 220 by the control unit 22 in the data area 110 of the NAND memory 10 includes storing of the log information corresponding to the deletion request data in the data area 110 of the NAND memory 10.

The storing of the user data to be non-volatilized in the data area 110 of the NAND memory 10 is implemented in the manner that the control unit 32 instructs the memory I/F 35 to write the user data to be non-volatilized into an in-NAND physical address, and the user data is stored in the NAND memory 10 via the memory I/F 35.

The storing of the deletion request data to be non-volatilized in the data area 110 of the NAND memory 10 is implemented in the manner that the control unit 32 instructs the memory I/F 35 to write the deletion request data to be non-volatilized into an in-NAND physical address, and the deletion request data is stored in the NAND memory 10 via the memory I/F 35.

The data to be non-volatilized are the user data and the deletion request data that are stored in the data storage area 220 of the RAM 20, and may be all or part of data determined to be valid by a sector flag.

Next, the control unit 32 of the memory controller 30 determines whether a second predetermined timing is reached (step 709). When it is determined that the first predetermined timing is not reached ("No" in step 707), the control unit 32 of the memory controller 30 also determines whether a second predetermined timing is reached (step 709).

When it is determined that the second predetermined timing is reached ("Yes" in step 709), the control unit 32 of the memory controller 30 non-volatilizes the logical NAND management information 232 and the in-NAND logical-tophysical conversion information 233 stored in the management information storage area 230 (step 710).

The control unit 32 of the memory controller 30 instructs the memory I/F 35 to write all or part of the data of the logical NAND management information 232 and the in-NAND logical-to-physical conversion information 233 stored in the management information storage area 230 of the RAM 20, and stores the data in the NAND memory 10 via the memory I/F 35.

In addition, the control unit 32 of the memory controller 30 may instruct the memory I/F 35 to write only management information that is not non-volatilized, among the logical NAND management information 232 and the in-NAND logical-to-physical conversion information 233 stored in the management information storage area 230 of the RAM 20, and may store the management information in the NAND memory 10 via the memory I/F 35.

The second predetermined timing is, for example, each timing when the size of data which are the user data and the deletion request data stored in the data storage area 220 and are to be stored in the NAND memory 10 reaches a certain unit, that is, each timing when the size of data to be stored in the data area 110 of the NAND memory 10 reaches a certain size. Here, the certain size may be any size such as a cluster size, page size, or block size.

Further, the second predetermined timing may be, for example, each timing when the data to be stored in the data area 110 of the NAND memory 10 has been completely stored in a predetermined area of the data area 110. The predetermined area may be an arbitrary area such as an area partitioned by a page unit, an area partitioned by a block unit, or the like.

Further, the second predetermined timing may be, for example, each timing when the management information that is not non-volatilized among the logical NAND management information 232 and the in-NAND logical-to-physical conversion information 233 stored in the management information storage area 230 reaches a certain size.

Further, the second predetermined timing may be, for example, a timing when the memory system 1 receives a command designating power-off or a command designating the shift to the power saving mode from the host device 2.

Further, the second predetermined second may be a timing overlapping with the first predetermined timing.

When it is determined that the second predetermined timing is not reached ("No" in step 709), the flowchart illustrated in FIG. 7 is ended.

In the flowchart of FIG. 7, the process of the reception of the write request shown in steps 701 to 703, the process of the reception of the deletion request shown in steps 704 to 706, the process of the non-volatilization of the user data and the deletion request data shown in steps 707 and 708, and the process of the non-volatilization of the management information shown in steps 709 and 710 are executed in this order. However, the control unit 32 may execute these processes in a different order from the above-described order. Further, the execution timings or execution periods of these processes may be same or different.

Figure 8:
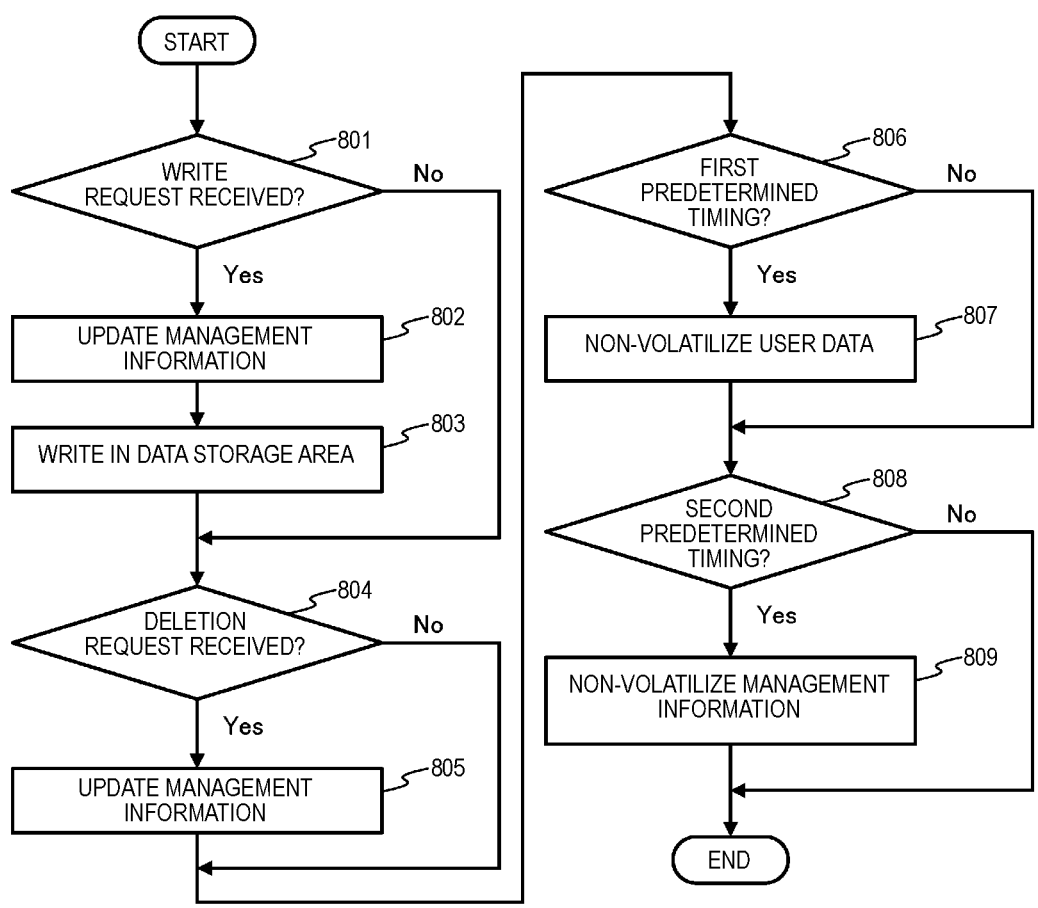
FIG. 8 is a flowchart illustrating an example of non-volatilization processing for a write request and a deletion request in a memory system according to a comparative example.

FIG. 8 is a flowchart illustrating an example of data non-volatilization processing for a write request and a deletion request received from the host device 2 of the memory system according to a comparative example. This flowchart shows a process of receiving a write request or a deletion request from the host device 2 and storing the requested data and information corresponding thereto in the NAND memory 10 in the same way as in FIG. 7.

The exemplary system configuration of the memory system according to the comparative example is the same as that of the block diagram shown in FIG. 1. The area configuration of the RAM 20 of the memory system and the area configuration of the NAND memory 10 according to the comparative example are also the same as that of the schematic views shown in FIGS. 3 and 4.

The management information managed in the management information storage area 230 of the RAM 20 of the memory system according to the comparative example is also the same as the management information managed in the management information storage area 230 of the RAM 30 of the memory system according to the present embodiment.

In the flowchart of FIG. 8 as well, similarly to the flowchart shown in FIG. 7, descriptions will be made on the premise that the memory controller of the memory system according to the comparative example may receive a write request or a deletion request from the host device 2 via the host I/F 31.

The memory controller of the memory system according to the comparative example determines whether a write request has been received from the host device 2 (step 801). When it is determined that a write request has been received ("Yes" in step 801), the control unit 32 of the memory controller 30 of the memory system of the comparative example determines an in-NAND physical address and an in-RAM physical address corresponding to a logical address designated by the write request. Further, the control unit 32 reflects the determined physical address in the management information of the management information storage area 230 (step 802).

The processing contents of step 801 are the same as the processing contents of step 701. The processing contents of step 802 are the same as the processing contents of step 702.

Then, the control unit 32 of the memory controller 30 of the memory system according to the comparative example encodes write target user data designated by the write request, and writes the encoded data into the data storage area 220 of the RAM 20 (step 803). The processing contents of step 803 are the same as the processing contents of step 703.

Next, the control unit 32 of the memory controller 30 of the memory system according to the comparative example determines whether a deletion request has been received from the host device 2 (step 804). When it is determined that a deletion request has been received ("Yes" in step 804), the control unit 32 determines an in-NAND physical address and an in-RAM physical address serving as deletion request data storage destinations. Then, the control unit 32 reflects the determined physical addresses in the RAM management information 231, the logical NAND management information 232 and the in-NAND logical-to-physical conversion information 233 which are the management information of the management information storage area 230 (step 805).

The processing contents of step 804 are the same as the processing contents of step 704. The processing contents of step 805 are also the same as the processing contents of step 705.

Next, the control unit 32 of the memory controller 30 of the memory system according to the comparative example determines whether a first predetermined timing for non-volatilizing the data stored in the data storage area 220 of the RAM 20 (step 806). When it is determined that the first predetermined timing ("Yes" in step 806) is reached, the control unit 32 stores the user data stored in the data storage area 220, in the NAND memory 10, and non-volatilizes the user data (step 807).

The processing contents of step 806 are the same as the processing contents of step 707. Similarly to the case of the memory system according to the present embodiment, the storing of the user data stored in the data storage area 220, in the data area 110 of the NAND memory 10 includes storing the log information corresponding to the user data in the data area 110 of the NAND memory 10.

Next, the control unit 32 of the memory controller 30 of the memory system 1 according to the comparative example determines whether a second predetermined timing is reached (step 808). When it is determined that the second predetermined timing reached ("Yes" in step 808), the control unit 32 non-volatilizes the logical NAND management information 232 and the in-NAND logical-to-physical conversion information 233 stored in the management information storage area 230 (step 809).

The processing contents of step 808 are the same as the processing contents of step 709. The processing contents of step 809 are also the same as the processing contents of step 710.

As illustrated in FIG. 8, the memory system according to the comparative example non-volatilizes the user data designated by the write request received from the host device 2, and does not non-volatilize the deletion request data received from the host device 2. In the memory system according to the comparative example, reflection of the deletion request received from the host apparatus 2 is implemented by storing the logical NAND management information 232 and the in-NAND logical-to-physical conversion information 233 of the management information storage area 230 in the management information storage area 120 of the NAND memory 10.

Therefore, when the logical NAND management information 232 and the in-NAND logical-to-physical conversion information 233 of the management information storage area 230 are stored in the management information area 120 of the NAND memory 10, in the memory system according to the comparative example, like the memory system according to the present embodiment, the deletion request received from the host device 2 is reflected in the memory system even after restarting the memory system, and the data corresponding to the LBA designated by the deletion request is treated as invalid data.

However, in the memory system according to the comparative example, the following problem occurs when the power supply is cut off due to unauthorized power-off or the like, before non-volatilizing the logical NAND management information 232 and the in-NAND logical-to-physical conversion information 233 of the management information storage area 230. That is, when the memory system 1 is started after power shutdown due to unauthorized power-off, although the logical NAND management information 232 and the in-NAND logical-to-physical conversion information 233 stored in the management information area 120 of the NAND memory 10 are deployed in the management information storage area 230 of the RAM 20, the deletion request from the host device 2 is not reflected in the deployed logical NAND management information 232 and in-NAND logical-to-physical conversion information 233.

Therefore, in the memory system according to the comparative example, when the logical NAND management information 232 and/or the in-NAND logical-to-physical conversion information 233 of the management information storage area 230 cannot be non-volatilized due to unauthorized power cut-off or the like, only information that has been already non-volatilized, among the logical NAND management information 232 and/or the in-NAND logical-to-physical conversion information 233, that is, only information reflected in the logical NAND management information 232 and/or the in-NAND logical-to-physical conversion information 233 stored in the management information area 120 of the NAND memory 10, can be restored at the time of start of the memory system after unauthorized power cut-off.

That is, in the memory system according to the comparative example, in the case where the logical NAND management information 232 and the in-NAND logical-to-physical conversion information 233 cannot be non-volatilized due to unauthorized power cutoff or the like, the contents of the deletion request received from the host device 2 before unauthorized power-off may not be restored at the time of start of the memory system after the unauthorized power-off.

In contrast, in the memory system of the present embodiment, when the deletion request is received from the host device 2, the deletion request data is non-volatilized by storing the deletion request data in the data area 110 of the NAND memory 10 at a predetermined timing.

Therefore, even when the power supply is cut-off due to unauthorized power-off or the like before the logical NAND management information 232 and the in-NAND logical-to-physical conversion information 233 of the management information storage area 230 of the RAM 20 are stored in the management information area 120 of the NAND memory 10, as long as the deletion request data is stored in the data area 110 of the NAND memory 10, it is possible to specify whether the deletion request for a certain LBA has been received before the unauthorized power-off by reading the deletion request data stored in the data area 110 of the NAND memory 10 and the log information corresponding to the deletion request data at the time of subsequent start of the memory system 1. Therefore, even when the contents of the deletion request are not reflected in the logical NAND management information 232 and the in-NAND logical-to-physical conversion information 233 stored in the management information area 120 of the NAND memory 10, when deploying the logical NAND management information 232 and the in-NAND logical-to-physical conversion information 233 stored in the area 120 into the management information storage area 230 of the RAM 20, the contents of the deletion request received from the host device 2 before start of the memory system 1 can be reflected in the logical NAND management information 232 and the in-NAND logical-to-physical conversion information 233.

That is, in the memory system according to the present embodiment, even when the logical NAND management information 232 and the in-NAND logical-to-physical conversion information 233 cannot be non-volatilized due to unauthorized power-off or the like, the contents of the deletion request received from the host device 2 before the unauthorized power-off or the like can be restored at the time of subsequent start of the memory system.

(Applications)

Figure 9:
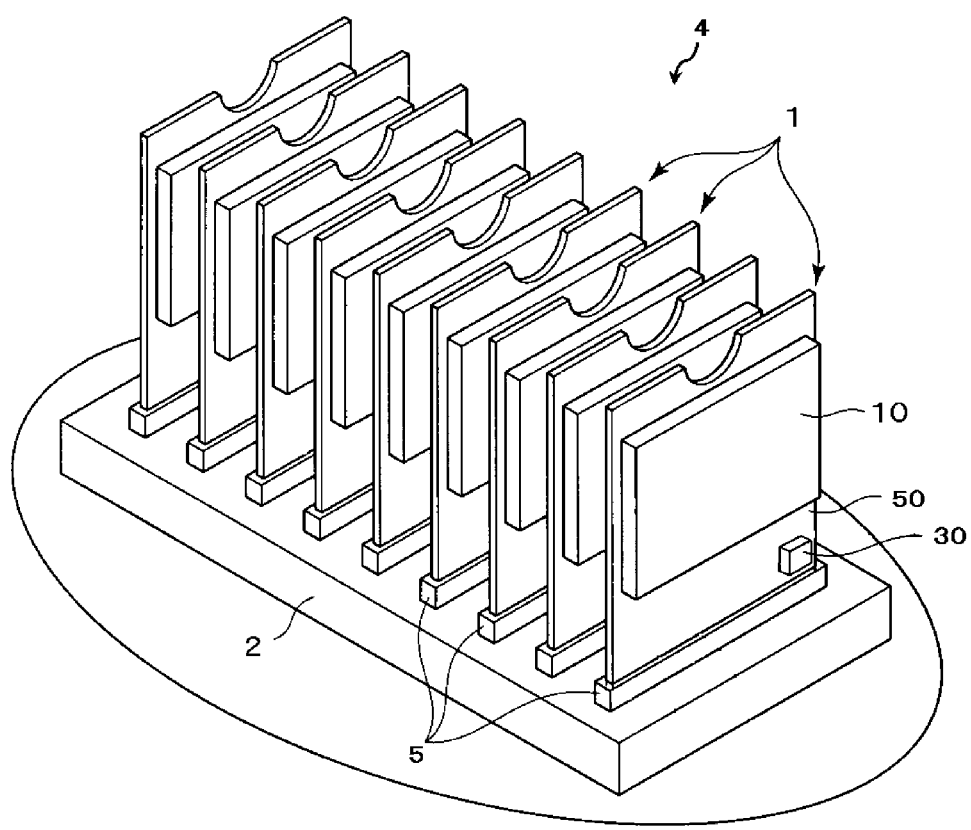
FIG. 9 is a view illustrating a system in which the memory system according to the embodiment is incorporated.
Figure 10:
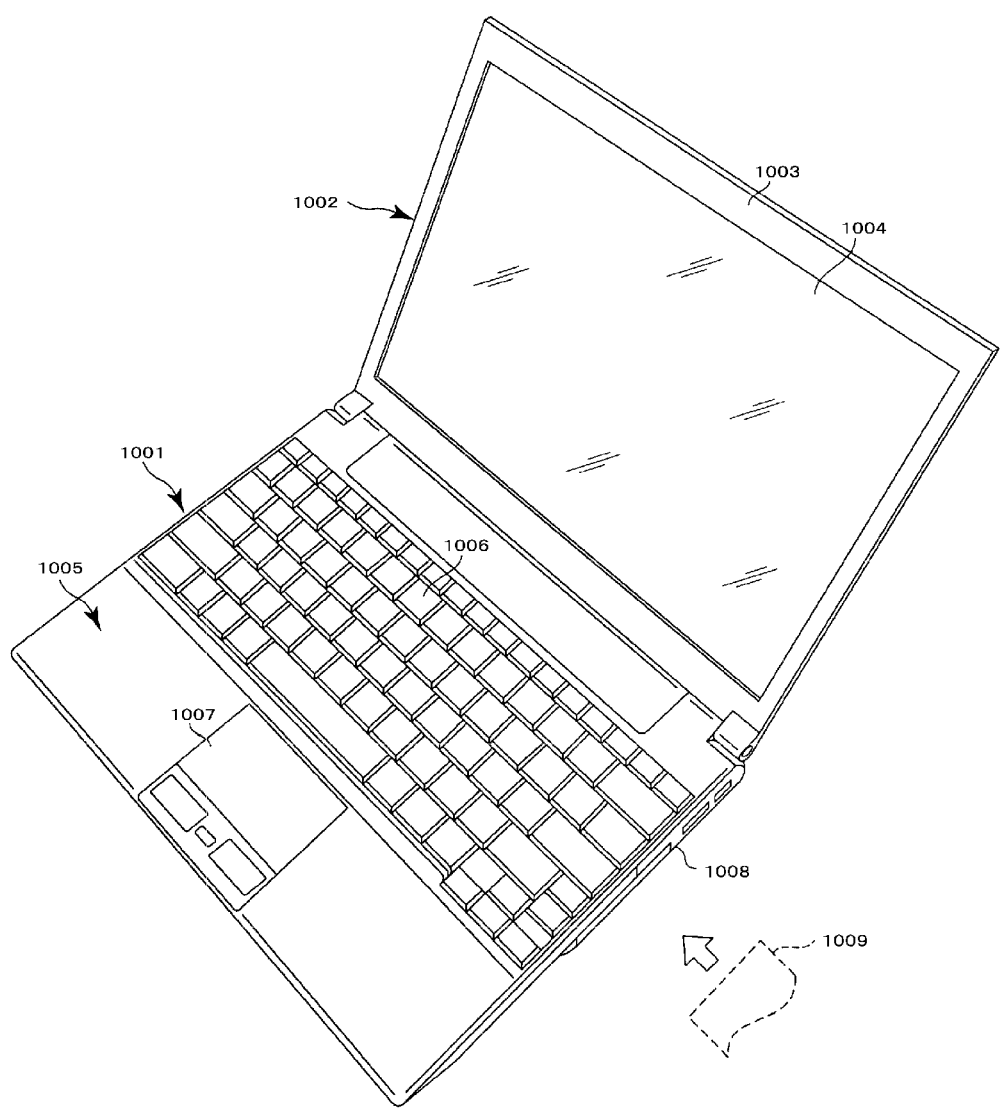
FIG. 10 is a view illustrating a portable computer in which the memory system according to the embodiment is incorporated.

FIGS. 9 and 10 show examples of a system 4 in which the memory system 1 and the host device 2 are incorporated. The system 4 is an example of an electronic apparatus.

As illustrated in FIG. 9, the memory system 1 is used as a storage device in the system 4 such as a server. The system 4 includes a memory system 1 and a host device 2 in which the memory system 1 is mounted. The host device 2 has, for example, a plurality of connectors 5 opened upward. The connectors 5 are, for example, slots.

In the system 4 illustrated in FIG. 9, an external power supply 3 is incorporated in the host device 2, and power is supplied from the external power supply 3 to a power supply circuit of the memory system 1 via the connectors 5.

In the example shown in FIG. 9, the memory system 1 includes a board 50 on which the NAND memory 10 and the memory controller 30 are mounted. A plurality of memory systems 1 are respectively mounted on the connectors 5 of the host device 2 and are supported side by side in a posture standing substantially in the vertical direction. With such a configuration, it is possible to compactly mount the plurality of memory systems 1, thereby making it possible to reduce the size of the host device 2. The aforementioned write request and deletion request are output from the host device 2 to the memory systems 1 via the connectors 5.

Further, the memory system 1 may be used as a storage device of an electronic apparatus such as a notebook type portable computer, a tablet terminal or other detachable notebook personal computers (PCs). As illustrated in FIG. 10, the memory system 1 is mounted on, for example, a portable computer corresponding to the host device 2. Here, the entire portable computer including the memory system 1 is the system 4.

The portable computer includes a main body 1001 and a display unit 1002. The display unit 1002 includes a display housing 1003 and a display device 1004 accommodated in the display housing 1003, and the aforementioned write request and deletion request are output from the portable computer to the memory system 1.

The main body 1001 includes a housing 1005, a keyboard 1006, and a touch pad 1007 which is a pointing device. The housing 1005 includes a main circuit board, an optical disk device (ODD) unit, a card slot 1008, and the like.

The card slot 1008 is provided on the lateral side of the housing 1005. A user may insert an additional device 1009 into the card slot 1008 from the outside of the housing 1005.

The memory system 1 may be used as a replacement of the hard disk drive (HDD) in a state where it is mounted inside the portable computer, or may be used as the additional device 1009.

Meanwhile, the present invention is not limited to the above-described embodiments, and may be modified in various ways in a scope that does not depart from the gist of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of protecting volatile data in a memory system connected to a host device, the memory system including a volatile memory and a nonvolatile memory, said method comprising:
   temporarily storing, in the volatile memory, management data including mapping information that associates a logical address managed by the host device with a physical address of the nonvolatile memory using one or more of a plurality of entries, each of the entries corresponding to data of a page and including a logical address managed by the host device, a logical address of the nonvolatile memory, a first flag indicating whether or not the page is valid, and a second flag indicating whether or not the page is designated to be deleted;
   upon receiving a deletion request from the host device, temporarily storing, in the volatile memory, first data including a logical address and a deletion range designated by the deletion request and updating the management data to specify data that are designated to be deleted by the deletion request, the first data being different from the management data and not including the mapping information;
   upon receiving a write request from the host device, temporarily store, in the volatile memory, temporarily storing, in the volatile memory, second data designated by the write request and updating the management data;
   when a first predetermined timing comes, saving the first data and the second data temporarily stored in the volatile memory in a first area of the nonvolatile memory;
   when a second predetermined timing that is different from the first predetermined timing comes, saving the management data temporarily stored in the volatile memory, in a second area of the nonvolatile memory; and
   when the memory system is powered off before the management data is stored in the second area of the nonvolatile memory, at a time of start of the memory system after the memory system is powered off, using the first data in the first area of the nonvolatile memory to restore the management data, and storing the restored management data in the volatile memory.

2. The method according to claim 1, further comprising:
   when storing the first data in the first area of the nonvolatile memory at the first predetermined timing, also storing a first log in the nonvolatile memory, the first log including first information corresponding to a time of reception of the deletion request, and
   when storing the second data in the second area of the nonvolatile memory at the second predetermined timing, also storing a second log in the nonvolatile memory, the second log including a logical address corresponding to the second data and second information corresponding to a time of reception of the write request.

3. The method according to claim 2, further comprising:
   at the time of start of the memory system, retrieving the first log and the second log stored in the nonvolatile memory, and also using the first and second logs to restore the management data.

4. The method according to claim 1, wherein the nonvolatile memory is a nonvolatile semiconductor memory.

5. The method according to claim 1, wherein
   the volatile memory includes a data storage area that temporarily stores the first data and the second data, and not the management data, and a management data storage area that temporarily stores the management data, and not the first data and the second data,
   the first predetermined timing includes a timing when a size of non-saved data in the data storage area that have not been saved in the first area of the nonvolatile memory reaches a first predetermined threshold, and
   the second predetermined timing includes a timing when a size of non-saved data in the management data storage area that have not been saved in the second area of the nonvolatile memory reaches a second predetermined threshold.

6. A computing device comprising:
a host; and
a memory system including a host interface configured to communicate with the host, a volatile memory, a nonvolatile memory including a first area and a second area different from the first area, and a memory controller configured to control the host interface, the volatile memory, and the nonvolatile memory, wherein
the memory controller is configured to:
  temporarily store, in the volatile memory, management data including mapping information that associates a logical address managed by the host device with a physical address of the nonvolatile memory using one or more of a plurality of entries, each of the entries corresponding to data of a page and including a logical address managed by the host device, a logical address of the nonvolatile memory, a first flag indicating whether or not the page is valid, and a second flag indicating whether or not the page is designated to be deleted,
  upon receiving a deletion request from the host device, temporarily store, in the volatile memory, first data including a logical address and a deletion range designated by the deletion request and update the management data to specify data that are designated to be deleted by the deletion request, the first data being different from the management data and not including the mapping information,
  upon receiving a write request from the host device, temporarily store, in the volatile memory, second data designated by the write request and update the management data,
  control the volatile memory and the nonvolatile memory to save the first data temporarily stored in the volatile memory and the second data temporarily stored in the volatile memory, in the first area the nonvolatile memory at a first predetermined timing,
  control the volatile memory and the nonvolatile memory to save the management data temporarily stored in the volatile memory, in the second area of the nonvolatile memory at a second predetermined timing that is different from the first predetermined timing, and
  in case of power-off before the management data is stored in the second area of the nonvolatile memory, at a time of start of the memory system after the power-off, use the first data in the first area of the nonvolatile memory to restore the management data, and store the restored management data in the volatile memory.

7. The computing device according to claim 6, wherein the memory controller
  when storing the first data in the first area of the nonvolatile memory at the first predetermined timing, also stores a first log in the nonvolatile memory, the first log including first information corresponding to a time of reception of the deletion request, and
  when storing the second data in the first area of the nonvolatile memory at the second predetermined timing, the memory controller stores a second log in the nonvolatile memory, the second log including a logical address corresponding to the second data and second information corresponding to a time of reception of the write request.

8. The computing device according to claim 7, wherein
  at the time of start of the memory system, the memory controller also uses the first log and the second log stored in the nonvolatile memory to restore the management data.

9. The computing device according to claim 6, wherein the nonvolatile memory is a nonvolatile semiconductor memory.

10. The computing device according to claim 6, wherein
  the volatile memory includes a data storage area that temporarily stores the first data and the second data, and not the management data, and a management data storage area that temporarily stores the management data, and not the first data and the second data,
  the first predetermined timing includes a timing when a size of non-saved data in the data storage area that have not been saved in the first area of the nonvolatile memory reaches a first predetermined threshold, and
  the second predetermined timing includes a timing when a size of non-saved data in the management data storage area that have not been saved in the second area of the nonvolatile memory reaches a second predetermined threshold.

11. A memory system which is accessible from a host device, comprising:
  a volatile memory;
  a nonvolatile memory including a first area and a second area different from the first area; and
  a memory controller configured to:
    temporarily store, in the volatile memory, management data including mapping information that associates a logical address managed by the host device with a physical address of the nonvolatile memory using one or more of a plurality of entries, each of the entries corresponding to data of a page and including a logical address managed by the host device, a logical address of the nonvolatile memory, a first flag indicating whether or not the page is valid, and a second flag indicating whether or not the page is designated to be deleted,
    upon receiving a deletion request from the host device, temporarily store, in the volatile memory, first data including a logical address and a deletion range designated by the deletion request and update the management data to specify data that are designated to be deleted by the deletion request, the first data being different from the management data and not including the mapping information,
    upon receiving a write request from the host device, temporarily store, in the volatile memory, second data designated by the write request and update the management data,
    control the volatile memory and the nonvolatile memory to save the first data temporarily stored in the volatile memory and the second data temporarily stored in the volatile memory, in the first area of the nonvolatile memory at a first predetermined timing,
    control the volatile memory and the nonvolatile memory to save the management data temporarily stored in the volatile memory, in the second area of the nonvolatile memory at a second predetermined timing that is different from the first predetermined timing, and
    in case of power-off before the management data is stored in the second area of the nonvolatile memory, at a time of start of the memory system after the power-off, use the first data stored in the first area of the nonvolatile memory to restore the management data, and store the restored management data in the volatile memory.

12. The memory system according to claim 11, wherein
when storing the first data in the first area of the nonvolatile memory at the first predetermined timing, the memory controller stores a first log in the nonvolatile memory, the first log including first information corresponding to a time of reception of the deletion request, and when storing the second data in the first area of the nonvolatile memory at the second predetermined timing, the memory controller stores a second log in the nonvolatile memory, the second log including a logical address corresponding to the second data and second information corresponding to a time of reception of the write request.

13. The memory system according to claim 12, wherein at the time of start of the memory system, the memory controller also uses the first log and the second log stored in the nonvolatile memory to restore the management data.

14. The memory system according to claim 11, wherein the nonvolatile memory is a nonvolatile semiconductor memory.

15. The memory system according to claim 11, wherein the volatile memory includes a data storage area that temporarily stores the first data and the second data, and not the management data, and a management data storage area that temporarily stores the management data, and not the first data and the second data, the first predetermined timing includes a timing when a size of non-saved data in the data storage area that have not been saved in the first area of the nonvolatile memory reaches a first predetermined threshold, and the second predetermined timing includes a timing when a size of non-saved data in the management data storage area that have not been saved in the second area of the nonvolatile memory reaches a second predetermined threshold.

* * * * *